US007738033B2

(12) United States Patent
Fischell et al.

(10) Patent No.: US 7,738,033 B2
(45) Date of Patent: Jun. 15, 2010

(54) ILLUMINATION DEVICE FOR A MONITORING CAMERA

(75) Inventors: Michael Fischell, Stuhr (DE); Martin Timm, Suederstapel (DE)

(73) Assignee: Airbus Deutschland GmbH, Hamburg (DE)

( * ) Notice: Subject to any disclaimer, the term of this patent is extended or adjusted under 35 U.S.C. 154(b) by 810 days.

(21) Appl. No.: 11/017,891

(22) Filed: Dec. 21, 2004

(65) Prior Publication Data

US 2005/0168625 A1 Aug. 4, 2005

(30) Foreign Application Priority Data

Dec. 23, 2003 (DE) ................................ 103 60 761

(51) Int. Cl.
*H04N 5/222* (2006.01)
*H04N 5/225* (2006.01)
*H04N 7/18* (2006.01)

(52) U.S. Cl. ........................ 348/370; 348/375; 348/143

(58) Field of Classification Search ................. 348/370, 348/371, 373, 375, 376; 362/3, 11, 16–18
See application file for complete search history.

(56) References Cited

U.S. PATENT DOCUMENTS 4,025,777 A * 5/1977 Hayakawa .................. 362/250
4,969,037 A * 11/1990 Poleschinski et al. ....... 348/370
5,089,895 A 2/1992 Fraker et al.
5,690,417 A * 11/1997 Polidor et al. ............... 362/244
5,752,104 A * 5/1998 O'Brien et al. ............. 396/191
6,091,453 A * 7/2000 Coan et al. .................. 348/373
6,454,437 B1 * 9/2002 Kelly .......................... 362/246
6,585,395 B2 * 7/2003 Luk ............................ 362/250
6,628,335 B1 * 9/2003 Numazaki et al. ........... 348/370
6,741,286 B2 * 5/2004 Meek et al. ................. 348/370
6,769,790 B2 * 8/2004 Fruhm et al. ................ 362/286
6,788,411 B1 * 9/2004 Lebens ....................... 356/394
6,893,139 B2 * 5/2005 Cercone et al. ............. 362/147
6,929,375 B2 * 8/2005 Satomi ........................ 362/11
7,256,833 B2 * 8/2007 Shaw et al. ................. 348/370
7,344,273 B2 * 3/2008 Lewis et al. ................. 362/233
7,424,216 B2 * 9/2008 Liem .......................... 396/155
2002/0125435 A1 9/2002 Cofer et al.
2005/0041143 A1 * 2/2005 Kakiuchi et al. ............ 348/370

FOREIGN PATENT DOCUMENTS

DE 29806743 U1 7/1998

(Continued)

OTHER PUBLICATIONS

Patent Abstracts of Japan, Bd. 017, No. 148 (E-1338), Mar. 24, 1993 & JP 04 313 986 A, Nov. 5, 1992.

(Continued)

*Primary Examiner*—David L Ometz
*Assistant Examiner*—Carramah J Quiett
(74) *Attorney, Agent, or Firm*—Christopher Paradies; Fowler White Boggs P.A.

(57) ABSTRACT

An illumination device is described for a monitoring camera with a plurality of light devices, each having a light device axis. The light device axes of the invention, intersect an optical axis of the monitoring camera.

The illumination device can have light devices that emit light in the visible range and/or in the near-infrared range.

13 Claims, 4 Drawing Sheets

FOREIGN PATENT DOCUMENTS

| | | | |
|---|---|---|---|
| DE | 298 05 743 | U1 | 2/1999 |
| DE | 29805743 | U1 | 2/1999 |
| DE | 100 64 098 A 1 | | 7/2002 |
| WO | WO 99/04378 | A | 1/1999 |

OTHER PUBLICATIONS

Correction of the German Office Action dated May 12, 2006 that cites DE 289 05 743 U1 which is misspelled and non-existent.

* cited by examiner

ILLUMINATION DEVICE FOR A MONITORING CAMERA

CROSS-REFERENCE TO PRIOR APPLICATION

The present application claims the benefit of previously filed co-pending German Patent Application, Appl. No. 103 60 761.7, filed Dec. 23, 2003, and incorporates by reference the contents therein.

FIELD OF THE INVENTION

The present invention relates to radiation emitting devices. In particular, the invention relates to an illumination device for a monitoring camera.

BACKGROUND OF THE INVENTION

Monitoring cameras that are sensitive to radiation in the infrared range and/or light in the visible range are used to monitor security-relevant areas in passenger aircraft. Such monitoring cameras are used, for example, to monitor cockpit doors, passenger doors, as well as the interior space of passenger aircraft. In complete darkness, as occurs, for example, during night flights, it is also necessary to additionally illuminate the monitoring region during use of monitoring cameras that are sensitive mostly to infrared light. For this purpose, illumination devices are used with light devices that emit radiation in the near-infrared range or in the visible light range. Infrared-emitting diodes or simple light-emitting diodes that emit light in the visible range are widely used as light devices in this context.

In traditional variants of illumination devices for monitoring cameras according to the prior art, a parallel arrangement of the camera optics and the illumination device is common. In order to achieve effective illumination of the monitoring area or the monitoring space in front of the monitoring camera, the infrared-emitting diodes (IRED) or the light-emitting diodes (LED) are arranged either with the camera optics behind a cover panel or the diodes are situated separately arranged on the housing front. The direction of emission of such illumination devices is determined mostly by the emission angle of the diodes as a result of the arrangement of the infrared-emitting diodes or light-emitting diodes parallel to the camera optics.

The already known variants of illumination devices often lead to overexposure of the image center of the image obtained with the monitoring camera, because the main radiation intensity of the diodes points in the direction of the camera optics and therefore to the center of the surveyed object. A higher contrast difference between image information in the image center and the edge regions of the image results from this, so that, for example, automatic evaluation of the image contents by appropriate image processing algorithms for image recognition, for recognition of access authorization and the like is hampered. In addition, security-relevant objects cannot be reliably identified precisely in the edge region of the image, because the image center is overexposed.

SUMMARY OF THE INVENTION

There may be a need to improve the already known illumination devices for monitoring cameras, so that uniform illumination of the monitoring area or monitoring space monitored with the monitoring camera and the image obtained from it may be achieved by establishing high contrast over the entire image surface as a result.

According to an exemplary embodiment of the present invention, an illumination device is provided with a plurality of light devices, each having a light device axis. The light device axes intersect an optical axis of the monitoring camera, i.e., the light device axes of the light devices do not run parallel to the optical axis of the monitoring camera. Uniform illumination of the monitoring area or monitoring space in front of the monitoring camera is achieved by the illumination device on this account. Undesired overexposure of the surveyed object in the direction of the optical axis may be avoided. The contrast of the image obtained by the illumination device of the invention may be uniform over the entire image surface and, in addition, well suited for evaluation by automated image processing algorithms. Any security-relevant objects and details in the edge region of the image may be readily recognized.

DETAILED DESCRIPTION OF EXEMPLARY EMBODIMENTS

Further exemplary embodiments and advantages are apparent from the following detailed description of the exemplary embodiment illumination device of the invention.

Figure 1:
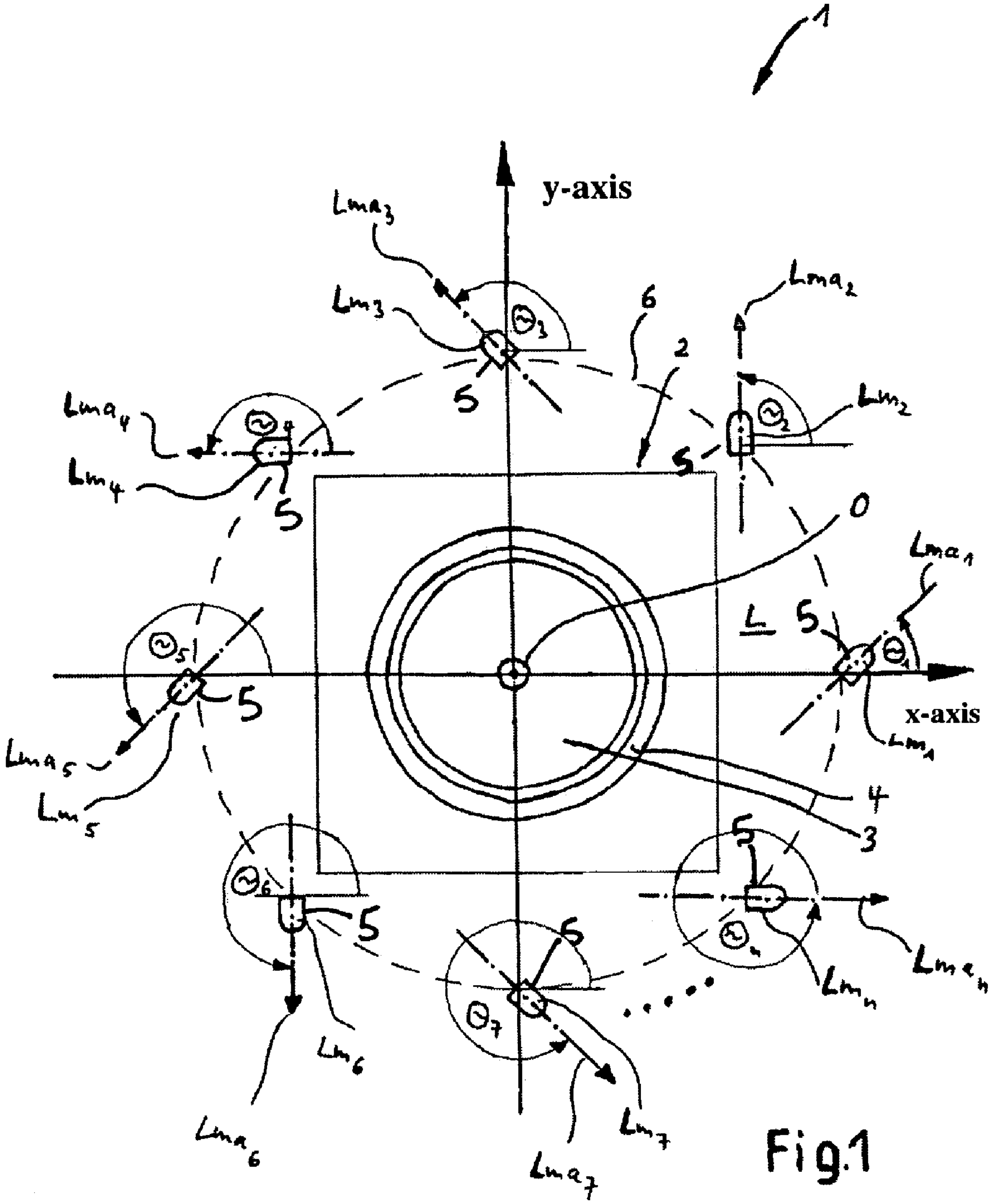
FIG. 1 shows a top view of the illumination device.

FIG. 1 shows an exemplary embodiment of an illumination device 1 in a view from above. The illumination device 1 encloses a monitoring camera with objective 3. The objective 3 is provided with an aperture 4, in order to largely avoid blinding of the monitoring camera 2 by the illumination device 1. The monitoring camera 2 has a vertical optical axis O perpendicular to the plane of the drawing or to a light device plate E spanning an x-and y-axis. The arrow on the optical axis O points in the direction of a surveyed object situated in front of the monitoring camera 2 in the monitoring space monitoring area, not further shown in the drawing in the interest of better clarity. As depicted the illumination device 1 of the invention, the objective 3, as well as the aperture 4, are positioned rotationally symmetric with reference to optical axis O. Deviating from this depicted arrangement, other positionings, for example, eccentric arrangement of the monitoring camera 2, aperture 4 and illumination device 1, are also possible. The illumination device may comprise a plurality of light devices 5, which emit light.

The illumination device 1 as depicted in FIG. 1 comprises eight light devices $Lm_{1, \ldots, n}$, arranged along a circular arc 6 and lying in the light device plane E spanned by the x-and y-axis. Light devices $Lm_{1, \ldots, n}$ each have the same spacing to the adjacent light device $Lm_{1, \ldots, n}$. The light devices $Lm_{l, \ldots, n}$ each have a light device axis $Lma_{1, \ldots}$, n and emit radiation in the near-infrared range or radiation in the visible range primarily in the direction of the arrow on the corresponding light device axis $Lma_{1, \ldots, n}$. The orientation of the light device axis $Lma_{1, \ldots, n}$ therefore corresponds to the main emission direction of the corresponding light device $Lm_{1, \ldots, n}$.

The arrangement of light devices $Lm_{1, \ldots, n}$ can also occur in a different way than the positioning shown in FIG. 1. For example, alternative embodiments position the light devices $Lm_{1, \ldots, n}$ along the perimeter of a square, a rectangular, a polygon or an arc, such as the arc of an elipse around the monitoring camera 2. A statistical arrangement, distributed over the surface of the light devices $Lm_{1, \ldots, n}$, is also conceivable as an alterative. It is also not essential that the light devices $Lm_{1, \ldots, n}$ be arranged in a light device plane E. For example, it is conceivable that the light devices $Lm_{1, \ldots, n}$ have different height positions relative to the optical axis O and may be arranged in different planes running parallel to the light device plane E. The number of light devices $Lm_{1, \ldots, n}$ is also not restricted in number to eight light devices $Lm_{1, \ldots, n}$ but may be any plurality of light devices $Lm_{1, \ldots, n}$ that better distributes the resulting light on the surveyed object.

Infrared-emitting diodes (IRED) or light-emitting diodes (LED) that emit light mostly in the visible range are preferably used as light devices $Lm_{1, \ldots, n}$, depending on the spectral sensitivity of the employed monitoring camera 2. The light-emitting diodes or infrared-emitting diodes have the advantage of long lifetime and limited sensitivity to vibration. As a result, diodes are almost maintenance-free. Instead of diodes, other light devices $Lm_{1, \ldots, n}$ can be used, for example, infrared lasers, infrared laser diodes or incandescent lamps.

In FIG. 1, the light device axis $Lma_1$ of the first light device $Lm_1$ forms an angle $\theta_1$ of about 45° with an x-axis. The y-axis is arranged at right angles to the x-axis. The angle $\theta_{2, \ldots, n}$ between the other light device axes $Lma_{2, \ldots, n}$ of the light devices $Lm_{2, \ldots, n}$ and the x-axis is increased preferably as a function of their position on the circular arc 6 in 45° steps, and therefore have values of about 90°, 135°, 180°, 225°, 270°, 315° and 360°. In principle, the angles $\theta_{1, \ldots, n}$ can assume any value between 0° and 360°. The corresponding light device axis $Lma_{1, \ldots, n}$; however, should preferably be aligned, so that it does not point exclusively toward camera 2 or aperture 4. This ensures that the main emission direction of each light device $Lm_{1, \ldots, n}$ is directed primarily outward from the monitoring camera 2 and the optical axis O. A uniform increase of angle θ, depicted in FIGS. 1 and 2 as a function of the position of light device $Lm_{1, \ldots, n}$ on circular arc 6 is not necessary.

The employed number of light devices $Lm_{1, \ldots, n}$ and their alignment is mostly dependent on their radiation intensity, the size and geometry of the monitoring area or monitoring space being monitored with the monitoring camera. Depending on these parameters, other values can be necessary for angle θ as a function of the arrangement of light devices $Lm_{1, \ldots, n}$ on circular line 6, in order to achieve optimal reproduction of a surveyed object.

In experiments, a number of seven light devices $Lm_{1, \ldots, n}$, arranged rotationally symmetric around the optical axis O, proved to be particularly advantageous for monitoring smaller monitoring spaces or monitoring areas. The experimental arrangement is not shown in the figures, in the interest of clarity. The seven light devices $Lm_{1, \ldots, 7}$ are arranged at a spacing from each other uniformly, starting from a "12 o'clock position" on a circular line. "12 o'clock position" in this context means that the light device $Lm_1$ is arranged at the upper intersection point between the y-axis and the circular line, and its light device axis $Lma_{m1}$ at this point points in the direction of the y-axis. Starting from the "12 o'clock position" of the first light device $Lm_1$, the other light device axes $Lma_{2, \ldots, 7}$ of light devices $Lm_{2, \ldots, 7}$ form an angle $\theta_{1, \ldots, 7}$ of 90°±10°, 230°±10°, 255°±10°, 270°±10°, 270°±10°, 285°±10°, 320°±10° with the x-axis in the clockwise direction.

Figure 2:
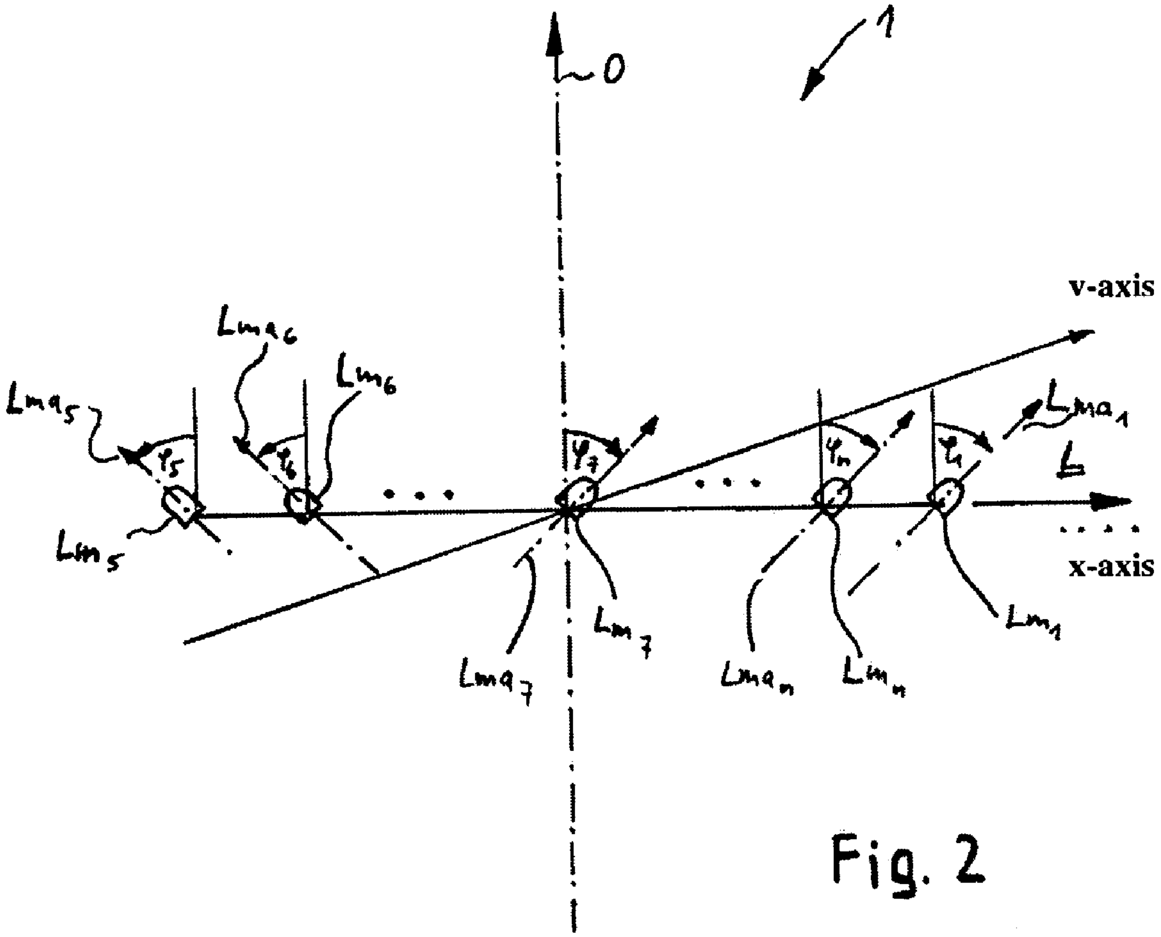
FIG. 2 shows a side view of the illumination device of FIG. 1.

FIG. 2 depicts the illumination device 1 of the invention in a side view. The optical axis O is perpendicular to the x-axis. In the depiction, in the interest of better graphic representation, five light devices $Lm_{5,6,7,n,1}$ are shown as examples. The light device axes $Lma_{5,6,7,n,1}$ of these light devices $Lm_{5,6,7,n,1}$ each form an angle $\phi_{5,6,7,n,1}$ of about 45° with the optical axis O. In experiments, values between 30° and 60° have proven to be suitable for the angle $\phi_{1, \ldots}$, n. The value $\phi_{1, \ldots}$, n of about 45° has proven to be particularly advantageous. Values for the angle $\phi_{1, \ldots}$, n lie outside of the range from 30° to 60°, lead to a significant deterioration in the imaging results or image obtained with the monitoring camera 2.

Figure 3:
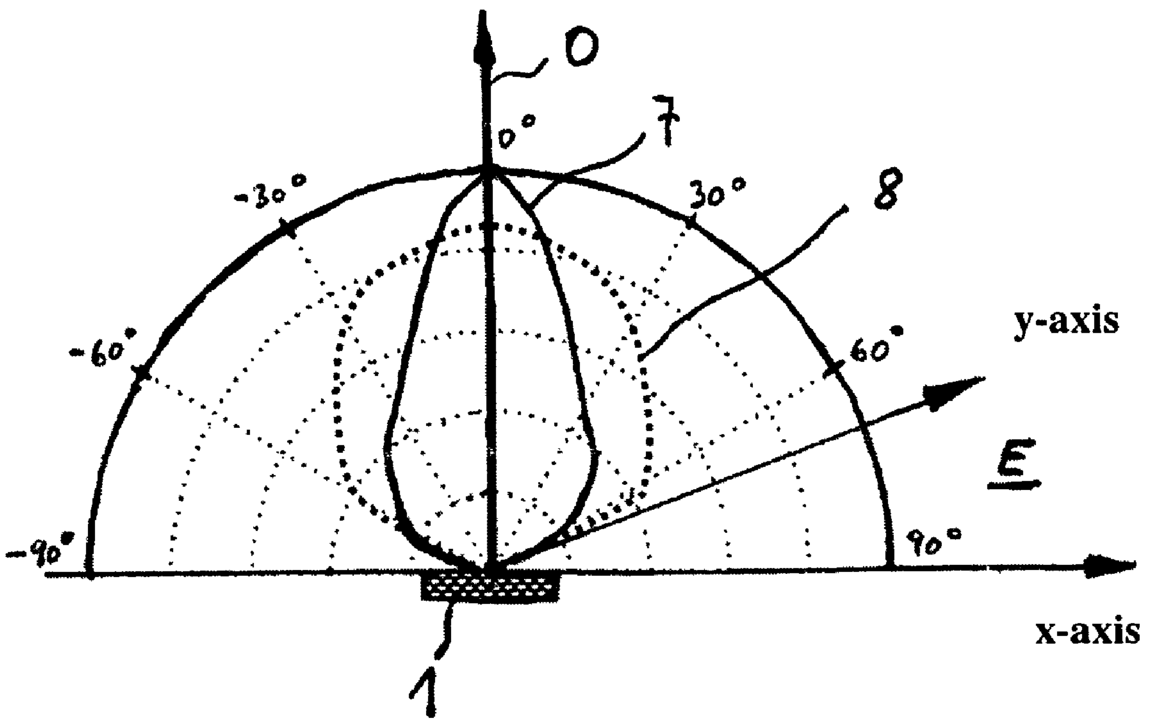
FIG. 3 shows a schematic view of the radiation distribution of the illumination device.

FIG. 3 shows a normalized depiction of illumination intensities achieved with the illumination device 1 of the invention in the monitoring region or monitoring space in front of the illumination device 1 along the optical axis O and the x-and y-axis. The angle numbers on the semicircle correspond to the corresponding spatial direction. A solid intensity curve 7 reflects the intensity distribution of the radiation, which is ordinarily achieved with known illumination devices, wherein the light device axes are aligned parallel to optical axis O of the camera. The spatial intensity distribution of radiation in space is obtained by rotation of the intensity curve 7 around the optical axis O, so that overall a "lobe-shaped" spatial intensity distribution is obtained. The height extent of curve 7 in the direction of optical axis O is a gauge of the intensity of radiation in this range. At angle number 0°, intensity curve 7 intersects optical axis O. At this point, the radiation intensity reaches a maximum. For comparison with intensity curve 7, an intensity curve 8, obtained using the illumination device 1 of the invention, is shown with a dotted line.

It is apparent in the schematic depiction of FIG. 3 that the intensity of the radiation in the immediate vicinity of optical axis O in the case of intensity curve 7 is distinctly higher than in intensity curve 8. The intensity curve 7 is also higher and narrower, whereas the intensity curve 8 is lower and wider. This means in the result, that with the illumination device 1 of the invention, better and mostly more uniform illumination of the monitoring area or monitoring space situated in front of the camera is obtained. More uniform contrast distribution of the image produced with monitoring camera 2 and the illumination device 1 follows on this account. The image can be better processed and evaluated by means of automated image processing algorithms. The illumination device avoids only point-like illumination of a surveyed object situated in the region of optical axis O within the monitoring region or monitoring space, which, in the known variants of illumination devices, leads to locally undesired high contrast differences of the produced image. Overexposure of a face of a person situated, for example, at limited distance in front of the monitoring camera does not occur.

Overall, the monitoring region or monitoring space is illuminated more uniformly by means of the illumination device 1 of the invention. The monitoring camera 2 therefore produces a monitoring image with good contrast over the entire image surface. In particular, objects and details that are situated outside of the image center or are far from the optical axis O of the monitoring camera 2 are imaged much better. The images so obtained can be evaluated and processed more easily manually or with appropriate image processing algorithms—for example, for automatic image recognition, for automated access control or the like.

Because of this, a significant increase in security of monitoring of hazardous regions is obtained, for example, in civil aircraft, since details, for example, weapons or other hazardous objects that a person is carrying near the body or in the hand, can also be recognized more easily in the edge region of the monitoring images. The illumination device 1 must naturally be adapted to the geometry and condition of the space or area being monitored. Adaptation occurs as previously described in the individual case by appropriate choice of the number and type of light devices, their radiation intensity, their emission characteristics and their alignment in the space, with reference to optical axis O (angle $\phi$, $\theta$) of the monitoring camera 2.

Figure 4:
FIG. 4 shows a test picture with an ordinary illumination device.

FIG. 4 shows a test image, made with a known illumination device, with an infrared monitoring camera. A test image is shown in FIG. 5 that was produced using the illumination device 1 of the invention and an infrared monitoring camera.

Figure 5:
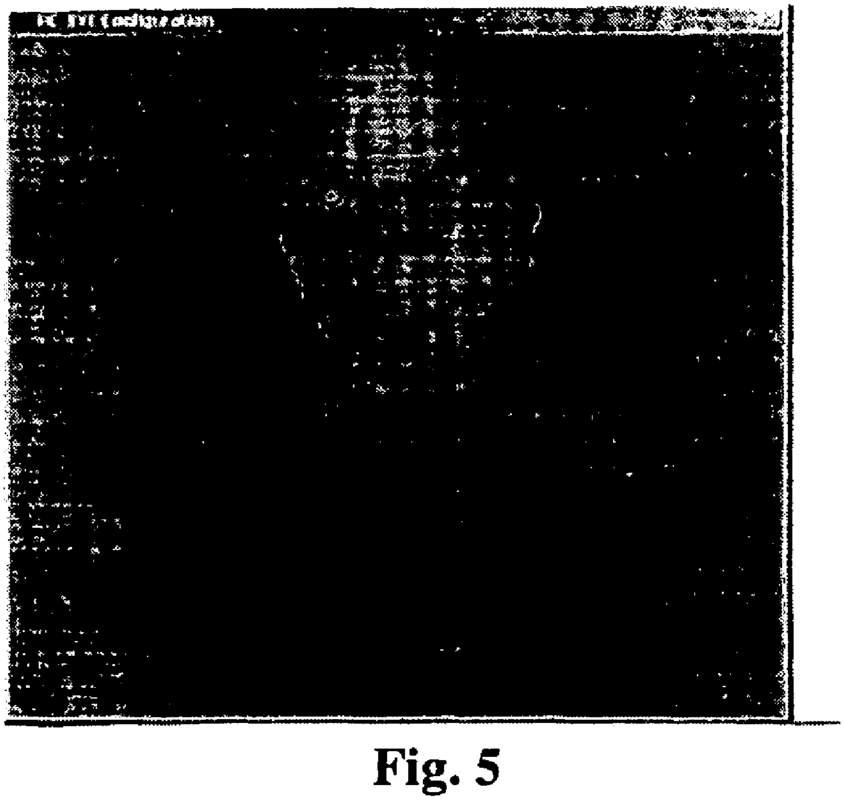
FIG. 5 shows a test picture with the illumination device of the invention.

It is apparent that the contrast of the test image in FIG. 4 in the boundary region between the face surface of the imaged person and the background does come out somewhat higher than the contrast of the image of FIG. 5 as a whole. However, objects and details that are situated outside of the image center of the test image in FIG. 4 can only be recognized poorly, because the contrast relative to the image edge rapidly diminishes as a result of point-like overexposure of the monitoring region or monitoring space along the optical axis O of monitoring camera 2 (cf. FIG. 4). On the other hand, the more uniform contrast distribution over the entire surface of the test image of FIG. 5 is adopted for better evaluation of the image contents over the entire surface of the image. Overexposure of the image center is avoided by the illumination device 2 of the invention. Objects and details that are situated outside of the image center of the test image of FIG. 5 are rich in contrast and, as a result, rich in detail and easily evaluable.

Images obtained with the illumination device of the invention can consequently be better evaluated manually or by automated image processing algorithms, for example, for image recognition or for checking access authorizations. In particular, security-relevant, hazardous objects and details outside of the image center are depicted readily recognizable and imaged.

Application areas for the illumination device of the invention include aircraft cabins, luggage and product areas in aircraft, passenger doors in aircraft, as well as cockpit doors in aircraft. The illumination device of the invention, however, is not restricted to use in the field of civil and military aviation. For example, in other security-relevant areas, like room monitoring and buildings, monitoring of outside surfaces of buildings or the like, as well as monitoring of passenger stops in public local and long-distance mass transit, may be monitored better using the illumination device.

The light devices $Lm_{1, \ldots, n}$ of the illumination device 1 of the invention, in the case of the use of an infrared monitoring camera that is sensitive mostly to radiation in the near-infrared range of the electromagnetic spectrum, have infrared-emitting diodes (IRED). For another variant of the invention, wherein the monitoring camera 2 is sensitive essentially only to visible light, the light devices preferably have white light-emitting diodes (LED) that preferably emit light in the region of the electromagnetic spectrum visible to the human eye.

By means of the illumination device 1 of the invention for a monitoring camera 2, uniform illumination of a monitoring region or monitoring space situated in front of monitoring camera 2 in the direction of optical axis O may be possible. Overexposure of a surveyed object situated in the region of optical axis O may be avoided, so that a more uniform contrast of an image obtained by means of the monitoring camera 2 with the aid of the illumination device 1 is produced. Off-center objects and details in the edge region of an image can be more easily recognized and evaluated. Because of this, a significant gain in security may be obtained relative to monitoring cameras that are provided with known illumination devices. Manual evaluation of the image content may be facilitated. Automatic image recognition algorithms for image recognition or for automated access control may be used more effectively.

It should be noted that the term “comprising” does not exclude other elements or steps and the “a” or “an” does not exclude a plurality. Also elements described in association with different embodiments may be combined.

It should also be noted that reference signs in the claims shall not be construed as limiting the scope of the claims.

What is claimed is:

1. An illumination device for a monitoring camera, the monitoring camera having an optical axis, the illumination device comprising:

a plurality of light devices being arranged in a light device plane perpendicular to the optical axis of the monitoring camera with an x-axis and a y-axis extending perpendicular to the optical axis, each of the plurality of light devices having a light device axis;

wherein the light device axes of each of the plurality of light devices arranged in the light device plane is oriented such that the light device axis has an angle of orientation, the angle of orientation being uniquely defined by two angular components including a first angle defined from the direction of the optical axis to the direction of the light device axis and a second angle measured from the direction of the x-axis to the direction of the light device axis, and, wherein each of the plurality of light devices are aligned and spaced, such that the angle of orientation of the light device axes of each of the plurality of light devices is uniquely defined by the first angle of 30° to 60° and the second angle in a range between 0° and 360°, the angle of orientation of any one of the plurality of light devices is different than the angle of orientation for each of the other of the plurality of light devices, none of the plurality of light devices has the second angle selected to be the same as the second angle of any of the other of the plurality of light devices, and each of the plurality of light devices has a respective nearest neighbor, wherein the second angle of each of the plurality of light devices is selected to be progressively larger than the respective clockwise nearest neighbor, starting from a first of the plurality of light devices having the second angle selected to be zero degrees to the last of the plurality of light devices having the second angle selected to be less than 360°.

2. The illumination device of claim 1, wherein the plurality of light devices are disposed along at least one line at a spacing to the optical axis.

3. The illumination device of claim 2, wherein the at least one line is a circular line around the optical axis; and wherein adjacent light devices of the plurality of light devices have the same spacing relative to each other.

4. The illumination device of claim 3, wherein the second angle defining the angle of orientation of the light device axis of a first one of the plurality of light devices is selected to be different than the second angle defining the angle of orientation of the light device axis of a second one of the plurality of light devices.

5. The illumination device of claim 1, wherein a one-piece illumination surface, containing the plurality of light devices is provided.

6. The illumination device of claim 5, wherein the illumination surface encloses the optical axis and has a circular or elliptical shape.

7. The illumination device of claim 1, wherein each of the plurality of light devices emit radiation invisible to the human eye.

8. The illumination device of claim 7, wherein the radiation is in the near-infrared range.

9. The illumination device of claim 1, wherein each of the plurality of light devices emit radiation visible to the human eye.

10. The illumination device of claim 1, wherein each of the plurality of light devices have at least one light source selected from the group of light sources consisting of infrared-emitting diodes, light-emitting diodes, infrared laser diodes, laser diodes, incandescent lamps, halogen lamps, gas discharge lamps, glow lamps, fluorescent lamps and electroluminescent elements.

11. The illumination device of claim 10, wherein each of the plurality of light devices has an infrared-emitting diode.

12. The illumination device of claim 1, wherein the plurality of light devices is eight light devices, each of the eight light devices is disposed along a circular line at a radial distance from the optical axis, and each of the eight light devices are disposed at an angular spacing of 45 degrees from the other of the eight light devices.

13. The illumination device of claim 12, wherein each of the eight light devices has two next nearest neighboring light devices along the circular line, and the two next nearest neighboring light devices along the circular line are each one of the eight light devices, and the second angle of each of the eight light devices is selected such that the second angle of each of the eight light devices is oriented at plus or minus 45 degrees from the second angle of each of the two next nearest neighboring light devices.

* * * * *